UNITED STATES PATENT OFFICE.

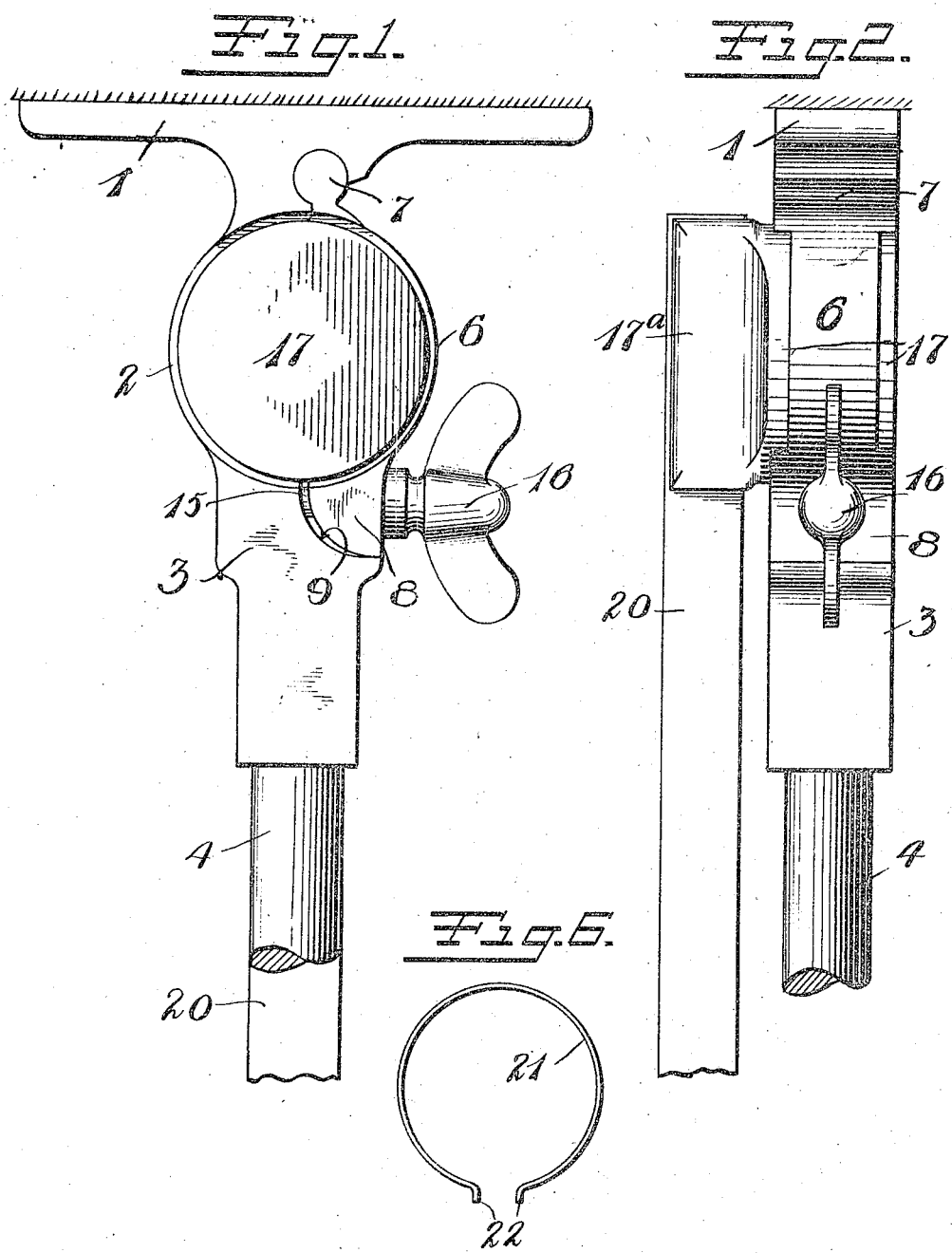

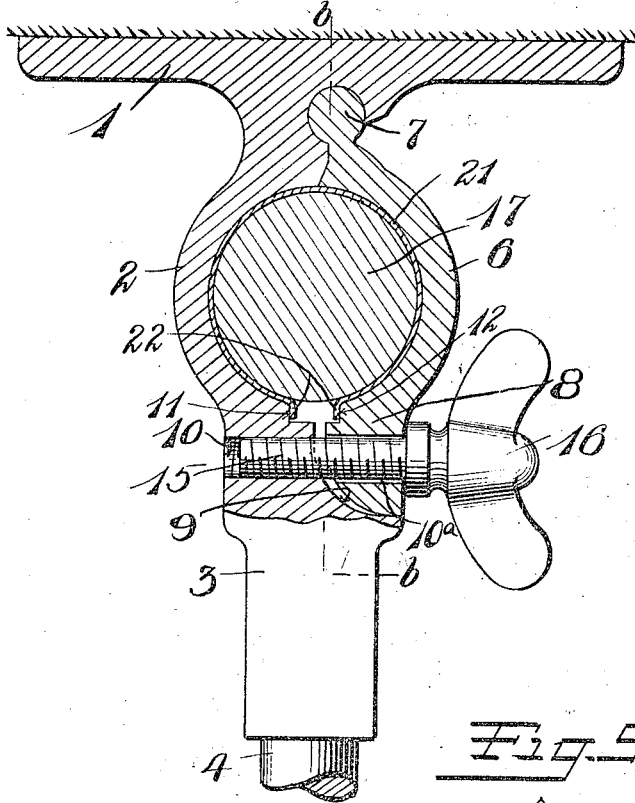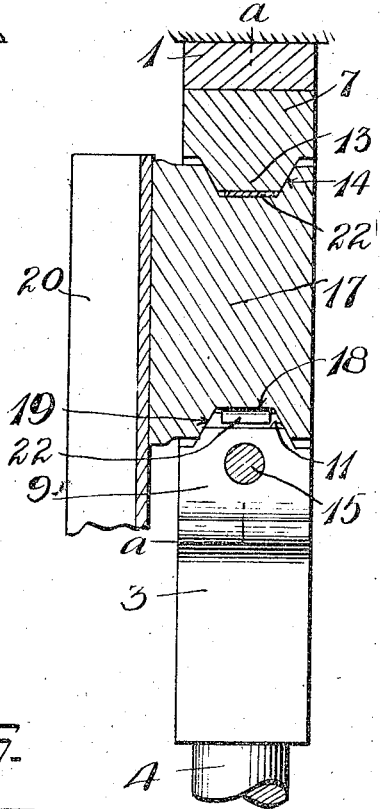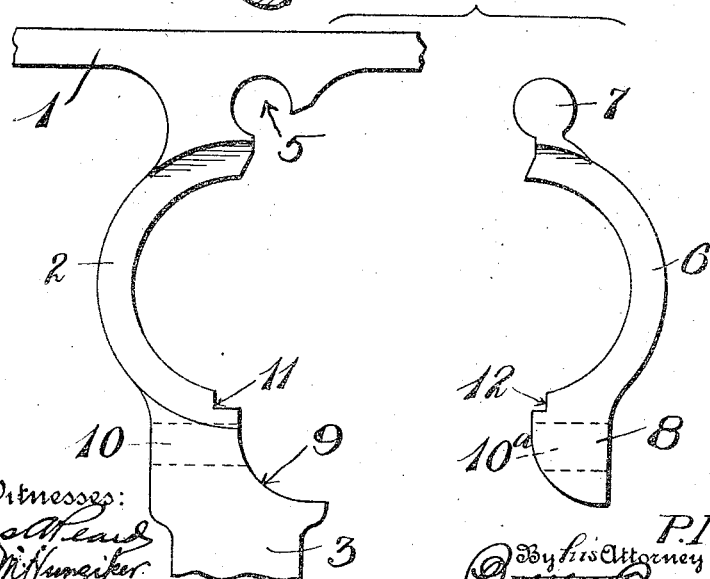

PETER N. LANDINE, OF MILFORD, CONNECTICUT, ASSIGNOR TO THE ROSTAND MANUFACTURING COMPANY, OF MILFORD, CONNECTICUT, A CORPORATION OF CONNECTICUT.

WIND-SHIELD MOUNTING.

1,122,509.  Specification of Letters Patent.  Patented Dec. 29, 1914.

Application filed March 7, 1913. Serial No. 752,562.

*To all whom it may concern:*

Be it known that I, PETER N. LANDINE, a citizen of the United States, residing at Milford, New Haven county, State of Connecticut, have invented certain new and useful Improvements in Wind-Shield Mountings, of which the following is a full, clear, and exact description.

This invention relates to hinge joint mountings for wind shields for motor cars and the like, and is designed to provide means whereby the shield itself may be readily attached at any time and whereby the movable section thereof may be readily and firmly clamped in adjusted position.

In the manufacture of motor cars, it frequently happens that, with the prior constructions of wind shield mountings, the painting of the car bodies will be delayed owing to the non-arrival of the wind shields, which it was necessary to first attach to the car before painting the same. This not only resulted in delay, but the practice of attaching the wind shield to the car body before painting frequently resulted in the glass of the wind shield being broken during the painting operation, and in its frame and other parts being stained and soiled by the paint.

The present invention aims to provide a construction whereby the wind shield frame may be attached to the car after its body has been painted, and in addition, aims to provide an efficient form of hinge joint for the movable section of the wind shield which enables said section to be securely clamped in adjusted position and to be readily applied to the car body after coming from the paint shop.

These and other advantages are more specifically recited in the following detailed specification, taken in connection with the accompanying drawings forming part thereof and illustrating a preferable embodiment of the invention.

In these drawings, Figure 1 is a view in side elevation of my improved form of wind shield mounting. Fig. 2 is a view in end elevation of said parts. Fig. 3 is a longitudinal vertical sectional view through said parts on the line *a—a*, Fig. 4. Fig. 4 is a transverse vertical section on the line *b—b* of Fig. 3. Fig. 5 is a view in elevation of the parts of the bracket socket detached. Fig. 6 is a detail of the clamping ring.

Referring to the drawings by numerals, 1 indicates a bracket plate adapted to be secured, for instance, to the roof of a motor car at a point above the dash. This bracket is provided with an integral and substantially semi-circular socket section 2 extending therefrom and provided at its end with a foot 3 to which the upper end of a supporting standard 4 is appropriately secured, this standard being attached, for instance, to the upper edge of a "built in" dash which may form, in effect, the stationary portion of the "wind shield."

In the bracket plate 1, adjacent the upper end of its socket portion 2, I provide an annular socket 5 designed to connect to the bracket plate the complemental section 6 of the socket, this section 6 being provided at its upper end with a knuckle 7 seating within the socket 5 and hinging the section 6 to the bracket plate and in coöperative relation with its complemental socket section 2. The provision of the knuckle 7 permits the section 6 to be readily attached to the bracket plate 1, this knuckle fitting the socket 5 snugly and yet permitting the section 6 to move freely relatively to the fixed section 2 of the socket member which these two complemental sections provide. The lower end of the movable section 6 is provided with a foot piece 8 having a curved edge, and the foot 3 of the fixed section is provided with a corresponding curved face 9. A smooth bore 10ᵃ extends through the foot portion 8 of the movable section, and an interiorly threaded and alined bore 10 is provided in the foot portion 3 of the fixed section. At their lower and abutting edges the interior faces of the two socket sections are shouldered down to provide shoulders or abutments 11 and 12 for the purpose hereinafter described. This socket member is designed to receive and adjustably hold a fitting attached to the movable section of the wind shield, and to that end, both of the portions 2 and 6 of these sections are preferably shaped in cross section to provide ribs 13 having beveled sides 14 somewhat in the nature of a tenon, the two sections forming a substantially annular socket provided with a substantially annular rib.

The two socket sections are formed to provide a minimum opening less than the complete circle of the arcs of their inner surfaces so that they may be moved to clamp therebetween a circular hub member. In order to effect this result, a threaded bolt 15 is provided adapted to be inserted through the bores 10—10ª of the socket member, its threads engaging the threads of the bore portion 10 and a winged head 16 being provided at its end whereby the feet 8—9 of the socket sections may be brought together to provide the requisite friction and pressure upon the hub member which is inserted within the socket. This hub member 17 is provided with a central channel 18 with outwardly beveled side walls 19, the cross section of this channel being slightly less than that of the rib portion 13 of the socket sections. To this hub member is appropriately secured a channel bar 20 forming the frame of and carrying the glass of the movable section of the wind shield. This channel bar may be attached by any suitable means as to lugs 17ª projecting from the hub 17. It will be understood, of course, while I have only described one hinge joint fitting, that in practice two supports will be provided, one for each end of the wind shield.

The beveled sides 14 of the socket member and the beveled walls 19 of the channel of the hub member 17 are designed to frictionally engage when the wing nut 16 is manipulated to clamp the rib 13 within the channel of the hub member. I may secure additional friction, and preferably do, by providing a flat-surfaced friction-ring 21 adapted to seat over the base of the channel 18 and provided with offset ends 22 which may be engaged by the abutment shoulders 11 and 12 of the socket sections 2 and 6. It will be evident, therefore, that the movable section 6 of the socket member having been opened to enlarge the area of socket opening, the hub 17 of the wind shield section may be freely inserted within the socket opening, its channel being positioned over the rib 13 of the fixed section 2 of the socket member and one of the ends 22 of the friction-ring engaging the shoulder 11 of the fixed section. The bolt 15 is then inserted through the bore 10ª of the movable section and the threaded bore 10 of the fixed section, and is manipulated to bring the movable section so that its rib portion 13 will frictionally engage the side walls 19 of the hub member 17. At the same time, its abutment shoulder 12 will engage the other end 22 of the friction-ring 21 and will clamp this ring against the base of the channel 18 of the hub member 17. From the foregoing, it will be seen, therefore, that a very strong friction lock is secured inasmuch as at least three friction surfaces are provided—*i. e.*, the beveled sides of the rib and channel portions of the hub and socket and at least one face of the friction-ring 21. In order to readjust the position of the shield section carried by the channel bar 20 and hub 17, it is only necessary to turn the winged head 16 to decrease the friction to a point where the shield and its hub may be swung to the desired angle, whereupon the winged head is again manipulated to provide locking friction as hereinbefore described.

The bracket plates with their socket members may be applied to the car body before it is painted and the wind shield section attached thereto after the painting operation by reason of the fact that the socket member is provided with a fixed portion and a relatively movable portion which affords an enlarged area of socket opening and permits the hub fitting of the wind shield section to be inserted therein and clamped when the movable section of the socket portion is moved back to decrease the size of socket opening. In addition to this feature, the provision of the channeled and ribbed structures of the interlocking parts affords a very strong and efficient friction clamp. The hub member being provided with a central channel therein, dispenses with the necessity of providing separate end plates, the end faces of the hub serving as end plates and the ribbed portion of the socket member seating in the central annular channel of the socket member.

While I have herein described a preferable embodiment of my invention, it should be understood that the same may be altered in detail and relative arrangement of parts within the spirit of the invention and the scope of the appended claims.

What I claim therefore, and desire to secure by Letters Patent is:

1. In a joint for wind shields, two hingedly connected parts, one of said parts including a cylindrical hub having an annular groove therein with outwardly and oppositely tapering side walls, and the other of said parts including a supporting bracket plate having an outwardly offset and relatively fixed socket portion arranged to seat in said hub groove and to partially embrace its periphery and having a complemental relatively movable socket portion hinged thereto and arranged to seat in the groove of said hub and embrace that portion of its periphery opposite to said fixed socket portion, said socket portions having their hub contacting faces shaped so as to partially fill said hub groove and become wedged therein and having oppositely disposed abutments internally thereof, manually controlled means for clamping said socket portions about said hub and into wedging engagement with the walls of its groove to hold said hub fixedly positioned between said socket members, and a friction ring seated around the hub at the base of its groove having offset ends coöperating with said socket portion abutments and operable by relative movement of said socket portions to frictionally engage said hub.

2. In a hinged joint for wind shields, a socket member forming one of two relatively movable hinged parts, said socket member including a fixed portion arranged to partially encircle the other part, and a relatively movable portion hinged to the fixed portion, said hinged portion being arranged to embrace the other part on the side opposite the fixed portion, said other part including a cylindrical hub arranged between the fixed and movable parts of the socket, the hinge connection between the parts of the socket comprising a knuckle arranged at one end of the hinged part, said fixed part being grooved transversely from one edge providing a socket to permit said knuckle to be inserted by a sliding movement transversely of the fixed part, and a clamping bolt arranged to secure the other end of the hinged member to the fixed member and to cause the two parts of said socket member to frictionally embrace and hold the hub, said hub having an annular groove with oppositely and outwardly tapered side walls, said socket members being shaped on their inner sides to partially fill said annular groove and to become wedged therein and having oppositely disposed abutments thereon, and a friction ring seated around the hub in the bottom of the channel having offset holding ends coöperating with the socket member abutments to engage and clamp the hub.

3. In a joint for wind shields, a bracket member arranged to be fixedly secured to the under face of a support and forming one of two relatively movable hinged parts, said bracket member comprising a solid base portion having an integral and substantially semi-circular portion extending therefrom, said base being grooved transversely from one edge to provide a socket, and a complemental substantially semi-circular socket member separate from said base and having at one end a knuckle arranged for insertion within said transverse groove by a sliding movement transversely of said base to hinge said knuckle thereto, the other of said parts including a cylindrical hub member arranged for insertion between the fixed and movable sections of the socket member, said latter member being provided with means arranged to move the hinged section relatively to the fixed section to cause said sections to frictionally embrace and hold said hub member, said hub member having an annular groove therein with oppositely and outwardly tapering walls, and said socket members having their hub-contacting faces shaped so as to partially fill said hub groove and become wedged therein when the parts of the socket are moved into engagement with said hub.

PETER N. LANDINE.

Witnesses:
K. FRANCES MAGINN,
B. G. CONNOR.